Patented Feb. 18, 1936

2,030,991

UNITED STATES PATENT OFFICE 2,030,991

AZO DYES AND METHODS FOR THEIR PREPARATION

Henry Jordan, Wilmington, Del., assignor to E. I. du Pont de Nemours & Company, Wilmington, Del., a corporation of Delaware No Drawing. Application June 28, 1932, Serial No. 619,739

6 Claims. (Cl. 260—84)

This invention relates to new azo dyes and more particularly refers to disazo dyes, especially adapted for dyeing weighted silk, and methods for their preparation.

It is an object of this invention to produce azo dyes which impart uniform colors of exceptional fastness to weighted silks. A further object is to produce dyes which exhaust well and discharge to a pure white with an alkaline discharge medium. Additional objects will appear hereinafter.

These objects are accomplished by the invention which is more fully hereinafter described and claimed.

The invention may be more fully understood by reference to the following examples in which the quantities are stated in parts by weight:

Example 1

197 parts of amino-azobenzene were dissolved with 5000 parts of water and 280 parts of a 31% hydrochloric acid solution at 90–95° C. The solution was cooled by the addition of ice to 10–15° C. and diazotized with 69 parts of sodium nitrite. The diazo solution was then added slowly to a solution of 343 parts of benzoyl-2-amino-5-naphthol-7-sulfonic acid in 4000 parts of water and 280 parts of sodium bicarbonate, which had been cooled by the addition of ice to 0–5° C. During the coupling a temperature of 0–5° C. should be maintained. After the diazo solution has been added, the coupling was stirred for about 30 minutes and was then heated to 85–90° C. The red dye does not pass into solution, but a violet by-product (probably para-coupling) can be found in the mother liquor. The dye was filtered and the press cake, in order to remove the violet by-product completely, was stirred up again with 6000 parts of water to which 40 parts of sodium hydroxide had been added, heated to 85–90° C. In order to improve the filtration, 100 parts of sodium chloride was added, after which the purified dye was filtered.

The new dye in its dry form was a reddish powder, soluble in hot water with a bright scarlet coloration; in concentrated sulfuric acid with a bright blue coloration. The new dye gave exceptionally even dyeings on weighted or unweighted silk in a bright bluish-scarlet shade. The dye bath exhausted very well and the dyeings showed a very good fastness to washing and to light. They discharged to a pure white with an alkaline discharge medium.

The new dye has, when in the form of free acid, the following probable formula:

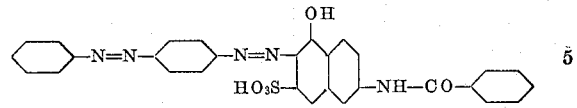

On reduction with stannous chloride it yielded: aniline, paraphenylenediamine and 2-benzoyl-amino-6-amino-5-naphthol-7-sulfonic acid.

In the above examples other aminoazo derivatives may be used with very satisfactory results. For instance, the phenyl nuclei may have substituted thereon groups such as alkyl, alkoxy, halogen, nitro, mono-alkyl-amino, and di-alkyl-amide. Neither of these nuclei should have substituted thereon solubilizing groups such as the carboxyl or sulfonic acid group. In selecting the component, designated by $R_2$ in the general formula, the position para to the amino group should be free in order that coupling may take place. It is also to be understood that no groups should be substituted in the components which would interfere with this coupling. Further, it is to be understood that this invention covers the case where an aminoazo benzene is produced by methods other than those heretofore described.

For the methyl, phenyl, and benzoyl nuclei used in place of the component $R_3$, in the above examples, other alkyl, aryl or acyl groups may be used and the aryl nucleus may have substituted thereon members such as alkyl, alkoxy, halogen, carbonyl, amino, and nitro. Among these components are acetyl, ortho-chlor-benzoyl, nitro-benzoyl, amino-benzoyl, toluyl, tolyl, and ethyl. In selecting components to take the place of $R_3$, in the general formula, care should be taken that these components do not contain solubilizing groups such as the carboxyl or sulfonic acid group. The components heretofore designated as $R_1$, $R_2$ and $R_3$ should be free from sulfonic and carboxylic acid groups, as previously mentioned. The absence of these solubilizing groups renders the resulting dyestuffs difficultly soluble, although they possess sufficient solubility to be exceedingly valuable for the dyeing of weighted silks. This solubility is roughly of the order of about 2 grams per litre of hot water. Where the term "difficultly soluble" is used in the specification or claims it is understood that it is the degree of solubility occasioned by the absence of sulfonic and carboxylic acid groups from the aforementioned components.

The disazo dyes herein described are especially adapted for dyeing weighted silks which they dye in uniform colors of exceptional fastness, particularly in shades ranging from bright scarlet to blue. They also give very satisfactory results when used for dyeing unweighted silk. They have a satisfactory exhaust; display an excellent fastness to washing and light; and discharge to a pure white with an alkaline discharge medium.

As many apparently widely different embodiments of this invention may be made without departing from the spirit and scope thereof, it is to be understood that I do not limit myself to the specific embodiments thereof, except as defined in the appended claims.

I claim:

1. A process for producing difficultly soluble azo dyes which comprises coupling a diazotized aminoazo compound of the benzene series, free from solubilizing groups, with an N-benzoyl derivative of 2-amino-5-naphthol-7-sulfonic acid, free from solubilizing groups other than the 7-sulfonic acid group mentioned.

2. A process for producing difficultly soluble azo dyes which comprises coupling a diazotized aminoazo compound of the benzene series, which may have substituted thereon members selected from the class consisting of alkyl, alkoxy, halogen, nitro, mono-alkylamino and di-alkylamino groups, with an N-benzoyl derivative of 2-amino-5-naphthol-7-sulfonic acid, wherein the acyl nucleus may have substituted thereon members selected from the class consisting of alkyl, alkoxy, halogen, nitro and amino groups.

3. A process for producing a difficultly soluble azo dye which comprises coupling diazotized amino-azobenzene with benzoyl-2-amino-5-naphthol-7-sulfonic acid.

4. Difficultly soluble azo dyes having, when in the form of their free acid, the following general formula:

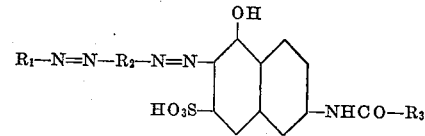

wherein $R_1$, $R_2$ and $R_3$ represent residues of the benzene series which are free from solubilizing groups.

5. Difficultly soluble azo dyes having, when in the form of their free acid, the following general formula:

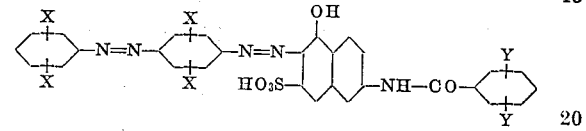

wherein X represents hydrogen or an alkyl, alkoxy, halogen, nitro, mono-alkylamino or di-alkylamino group, and Y represents hydrogen or an alkyl, alkoxy, halogen, nitro or amino group.

6. A difficultly soluble azo dye having, when in the form of its free acid, the following formula:

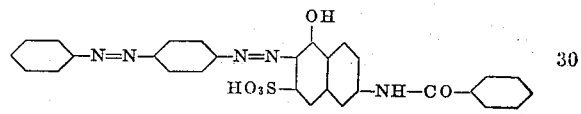

which is a reddish powder, soluble in hot water with a bright scarlet coloration, and in concentrated sulfuric acid with a bright blue coloration.

HENRY JORDAN.

CERTIFICATE OF CORRECTION.

Patent No. 2,030,991.  February 18, 1936.

HENRY JORDAN.

It is hereby certified that error appears in the printed specification of the above numbered patent requiring correction as follows: Page 1, second column, line 16, for the syllable "amide" read amino; and that the said Letters Patent should be read with this correction therein that the same may conform to the record of the case in the Patent Office.

Signed and sealed this 21st day of April, A. D. 1936.

Leslie Frazer (Seal)  Acting Commissioner of Patents.